(12) United States Patent
Furusawa et al.

(10) Patent No.: US 9,855,831 B2
(45) Date of Patent: Jan. 2, 2018

(54) LIQUID-SEALED ANTIVIBRATION DEVICE

(71) Applicant: TOYO TIRE & RUBBER CO., LTD., Osaka-shi, Osaka (JP)

(72) Inventors: Norimitsu Furusawa, Osaka (JP); Tatsuki Ikawa, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 38 days.

(21) Appl. No.: 14/980,377

(22) Filed: Dec. 28, 2015

(65) Prior Publication Data
US 2016/0186831 A1 Jun. 30, 2016

(30) Foreign Application Priority Data
Dec. 25, 2014 (JP) .................. 2014-262522

(51) Int. Cl.
*B60K 5/12* (2006.01)
*F16F 13/10* (2006.01)
*F16F 13/26* (2006.01)

(52) U.S. Cl.
CPC .......... *B60K 5/1208* (2013.01); *F16F 13/105* (2013.01); *F16F 13/264* (2013.01)

(58) Field of Classification Search
CPC .... B60K 5/1208; F16F 13/105; F16F 13/264; F16F 13/10; F16F 13/103; F16F 13/08
USPC ...................... 267/140.11, 140.13
See application file for complete search history.

(56) References Cited

U.S. PATENT DOCUMENTS

| | | | | |
|---|---|---|---|---|
| 6,311,963 B1* | 11/2001 | Suzuki | ................ | F16F 13/108 267/140.13 |
| 2002/0149143 A1* | 10/2002 | Yamamoto | ............ | F16F 13/105 267/140.12 |
| 2009/0140477 A1* | 6/2009 | Michiyama | ........... | F16F 13/106 267/140.13 |
| 2011/0006466 A1* | 1/2011 | Ichikawa | .............. | F16F 13/105 267/140.13 |
| 2012/0049423 A1* | 3/2012 | Ishikawa | ............... | F16F 13/106 267/140.13 |
| 2012/0139174 A1* | 6/2012 | Matsumoto | ............ | F16F 13/10 267/140.13 |
| 2015/0219178 A1* | 8/2015 | Okumura | .............. | F16F 13/106 267/140.13 |

FOREIGN PATENT DOCUMENTS

JP 2014-85003 A 5/2014

* cited by examiner

*Primary Examiner* — Melanie Torres Williams
(74) *Attorney, Agent, or Firm* — Westerman, Hattori, Daniels & Adrian, LLP (57) ABSTRACT

A liquid-sealed antivibration device capable of improving the position accuracy of an outer fitting member and a diaphragm. An outer fitting member (11) is externally fitted on a partition member (20) with an interposition portion (10*b*) interposed, and the interposition portion (10*b*) is made to be fixed in thickness. Thus, when a diameter reduction process is given to a second attaching member (3), the outer fitting member (11) is restrained from being displaced in a direction to slip out of the partition member (20). Therefore, the outer fitting member (11) is restrained from falling eccentric or inclined relative to the partition member (20), and hence, it can be realized that the outer fitting member (11) and the diaphragm (10) are improved in position accuracy.

9 Claims, 6 Drawing Sheets

LIQUID-SEALED ANTIVIBRATION DEVICE

TECHNICAL FIELD

The present invention relates to a liquid-sealed antivibration device, and particularly to, a liquid-sealed antivibration device capable of improving the position accuracy of an outer fitting member and a diaphragm.

BACKGROUND ART

Heretofore, as liquid-sealed antivibration devices used for motor vehicles, there has been known a liquid-sealed antivibration device which comprises a first attaching member, a cylindrical second attaching member, an antivibration base body connecting these first attaching member and second attaching member and constituted by a rubber-like elastic body, a diaphragm defining a liquid-sealed chamber between itself and the antivibration base body and constituted by a rubber-like elastic body, a partition member dividing the liquid-sealed chamber, and an orifice making communication between the liquid-sealed chambers divided by the partition member.

Patent Literature 1 discloses a technology wherein an outer edge part of a diaphragm is vulcanization-bonded (connected) to a cylindrical diaphragm attachment (outer fitting member) with a larger inside diameter than the outside diameter of a partition member, wherein the diaphragm attachment is externally fitted with the diaphragm interposed between itself and the partition member, and wherein a second attaching member is subjected to a diameter reduction process.

CITATION LIST

Patent Literature

[Patent Literature 1] JP-A No. 2014-85003 (for example, paragraph 0043, FIG. 1 and the like)

SUMMARY OF THE INVENTION

Technical Problem

However, in the aforementioned related art, the inner peripheral surface at a part of the diaphragm which part is interposed between the partition member and the diaphragm attachment (the outer fitting member) is formed to incline like a taper, while at an angle corresponding to the taper, the outer peripheral surface of the partition member is formed to incline like a taper. Thus, when the second attaching member is subjected to the diameter reduction process, the diaphragm attachment is apt to be displaced in a direction to slip out of the partition member by the action of the taper surface. That is, the eccentricity or inclination of the diaphragm attachment relative to the partition member is apt to occur. This gives rise to a problem that the diaphragm attachment and the diaphragm are insufficient in position accuracy.

The present invention has been made in order to address the aforementioned problem, and an object of the present invention is to provide a liquid-sealed antivibration device capable of improving the position accuracy of an outer fitting member and a diaphragm.

Solution to Problem and Advantageous Effects of Invention

According to a liquid-sealed antivibration device of the present invention, since an outer fitting member is externally fitted on a partition member with an interposition portion interposed therebetween, wherein the interposition portion is set to be a fixed dimension in thickness, the outer fitting member can be restrained from being displaced in a direction to slip out of the partition member when a second attaching member is subjected to a diameter reduction process. Therefore, the outer fitting member is restrained from falling eccentric or inclined relative to the partition member, and hence, it can be realized that the outer fitting member and a diaphragm are improved in position accuracy.

Further, since the partition member is provided with a protruding portion which protrudes radially outward from an outer peripheral surface and with which an axial end surface of the externally fitted outer fitting member is brought into contact, it is possible to position the outer fitting member relative to the partition member, and the outer fitting member can be restrained from inclining relative to the partition member. Therefore, the second attaching member can be restrained from being subjected to the diameter reduction process with the outer fitting member inclining relative to the partition member, and hence, it can be realized that the outer fitting member and the diaphragm are improved in position accuracy.

According to the liquid-sealed antivibration device of the present invention, in addition to the advantageous effects attained in the liquid-sealed antivibration device described above, since concavities are provided to be hollow on one of the outer peripheral surface of the partition member and an inner peripheral surface of the interposition portion, it is possible to make small the contact area or contact pressure between the outer peripheral surface of the partition member and an inner peripheral surface of the interposition portion by that amount. As a result, the outer fitting member can be externally fitted on the partition member smoothly.

Further, since the concavities are arranged to be distributed in the circumferential direction, it becomes easy to allow the displacement in the radial direction of the outer fitting member relative to the partition member by taking advantage of the deformation of the interposition portion. That is, in performing the diameter reduction process of the second attaching member, the eccentricity of the outer fitting member relative to the partition member can be offset, and hence, it can be realized that the outer fitting member and the diaphragm are improved in position accuracy.

According to the liquid-sealed antivibration device of the present invention, in addition to the advantageous effects attained in the liquid-sealed antivibration device described above, since the concavities are provided to be hollow on the inner peripheral surface of the interposition portion, such concavities can be formed by mold-forming by the use of a vulcanization mold, so that a reduction in manufacturing cost can be realized.

According to the liquid-sealed antivibration device of the present invention, in addition to the advantageous effects attained in the liquid-sealed antivibration device described above, since the outside diameter dimension of the outer fitting member is set to the same dimension as, or a smaller dimension than, the outside diameter dimension at the protruding portion of the partition member, the outer peripheral surface of the outer fitting member can be restrained form protruding radially outward beyond a protruding extreme end surface of the protruding portion. Thus, when the partition member with the outer fitting member externally fitted thereon is inserted into the second attaching member, such a situation can be restrained that a resistance in the opposite direction to the inserting direction acts from a film portion to the outer fitting member to cause position aberration. Therefore, it is possible to improve the position accuracy of the outer fitting member relative to the partition member.

According to the liquid-sealed antivibration device of the present invention, in addition to the advantageous effects attained in the liquid-sealed antivibration device described above, since the outside diameter dimension of the outer fitting member is set to the same dimension as the outside diameter dimension at the protruding portion of the partition member, the adhesion is improved with which the film portion is closely adhered to the protruding portion and the outer fitting member when the second attaching member is subjected to the diameter reduction process. As a result, an improvement is made in sealing property of performing a fluid-tightness between the partition member and the outer fitting member.

According to the liquid-sealed antivibration device of the present invention, in addition to the advantageous effects attained in the liquid-sealed antivibration device described above, since restraint means for restraining the outer fitting member from being displaced relative to the partition member in a direction to separate from the protruding portion is formed at least on one of the outer peripheral surface of the partition member and the inner peripheral surface of the interposition portion, the outer fitting member can be restrained from being displaced in a direction to slip out of the partition member. Therefore, the outer fitting member can be restrained from inclining relative to the partition member when the diameter reduction process is given to the second attaching member, and the outer fitting member and the diaphragm can be improved in position accuracy.

According to the liquid-sealed antivibration device of the present invention, in addition to the advantageous effects attained in the liquid-sealed antivibration device described above, since the restraint means is formed on the outer peripheral surface of the partition member, the forming of the restraint means can be done easily. Specifically, where the restraint means is formed at the interposition portion connected to the outer edge part of the diaphragm, the restraint means is formed at the time of a vulcanization forming of the diaphragm in a direction orthogonal to a direction in which a vulcanization mold is drawn out, and this requires drawing the vulcanization mold by force out of the inner peripheral surface of the diaphragm. In contrast, where the restraint means is formed on the outer peripheral surface of the partition member, it is possible to form the restraint means in a direction in which a mold for mold-forming the partition member is drawn out, and this makes it easy to draw out the mold. As a result, the forming of the restraint means can be done easily.

According to the liquid-sealed antivibration device of the present invention, in addition to the advantageous effects attained in the liquid-sealed antivibration device described above, since the restraint means is a projectingly disposed part which is provided to project radially at the outer peripheral surface of the partition member, the contact pressure at the interposition portion can be made high by making the projectingly disposed part cut into the interposition portion. Therefore, the outer fitting member can be restrained from slipping out of the partition member, and as a result, when the second attaching member is subjected to the diameter reduction process, the outer fitting member can be restrained from inclining relative to the partition member, so that the outer fitting member and the diaphragm can be improved in position accuracy.

According to the liquid-sealed antivibration device of the present invention, in addition to the advantageous effects attained in the liquid-sealed antivibration device described above, since the outer peripheral surface of the projectingly disposed part gradually decreases in outside diameter as going from an end part in the axial direction toward the protruding portion side, the outer fitting member can be restrained from being displaced relative to the partition member in a direction to separate from the protruding portion.

That is, because the outer peripheral surface of the projectingly disposed part is made as a surface sloping relative to the axial direction, the direction in which the outer fitting member is displaced by the action of an elastic return force of the interposition portion can be made as a direction in which the outer fitting member comes close to the protruding portion relative to the partition member. Thus, since the outer fitting member can be restrained from being displaced relative to the partition member in a direction to separate from the protruding portion, the outer fitting member can be restrained from being displaced in a direction to slip out of the partition member. Accordingly, when the second attaching member is subjected to the diameter reduction process, the outer fitting member can be restrained from inclining relative to the partition member, so that the outer fitting member and the diaphragm can be improved in position accuracy.

According to the liquid-sealed antivibration device of the present invention, in addition to the advantageous effects attained in the liquid-sealed antivibration device described above, since a protrusion of the interposition portion is engaged with a concavity of the partition member when the outer fitting member is externally fitted on the partition member, the outer fitting member can be restrained from being displaced in a direction to slip out of the partition member. Accordingly, when the second attaching member is subjected to the diameter reduction process, the outer fitting member can be restrained from inclining relative to the partition member, so that the outer fitting member and the diaphragm can be improved in position accuracy.

Further, since the protrusion of the interposition portion and the concavity of the partition member are formed to take the same shape, the elastic deformation of the protrusion can be avoided to occur when the protrusion and the concavity are engaged. Accordingly, when the outer fitting member is externally fitted on the partition member, it can be restrained that a force acts on the outer fitting member to displace the same relative to the partition member by the elastic return force of the interposition portion. Thus, since the outer fitting member can be restrained from being displaced relative to the partition member in a direction to separate from the protruding portion, the outer fitting member can be restrained from being displaced in a direction to slip out of the partition member. Accordingly, when the second attaching member is subjected to the diameter reduction process, the outer fitting member can be restrained from inclining relative to the partition member, so that the outer fitting member and the diaphragm can be improved in position accuracy.

DESCRIPTION OF EMBODIMENTS

Figure 1:
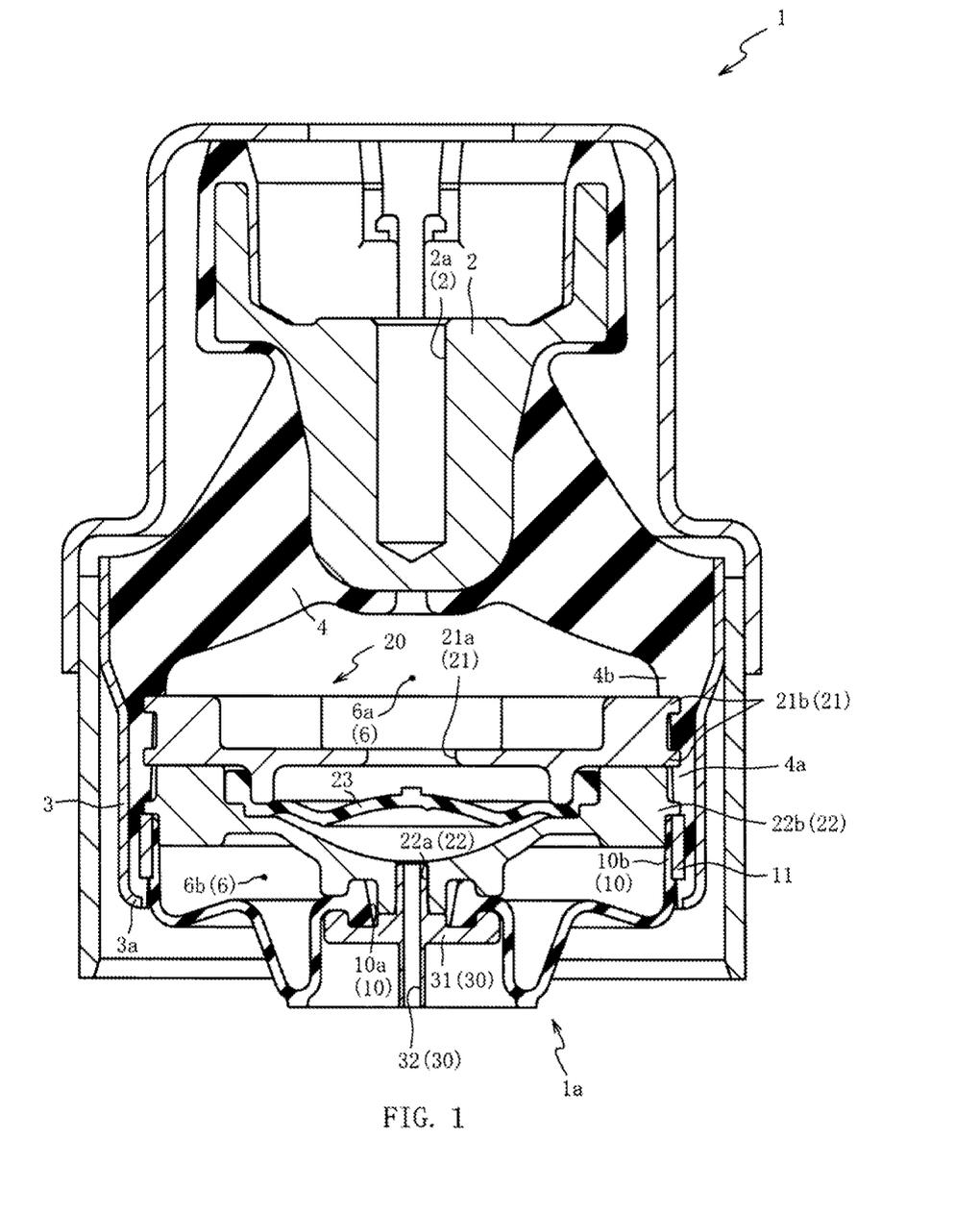
FIG. 1 is an axial sectional view of a liquid-sealed antivibration device in a first embodiment.

Hereafter, preferred embodiments of the present invention will be described with reference to the accompanying drawings. FIG. 1 is an axial sectional view of a liquid-sealed antivibration device 1 in a first embodiment of the present invention. Incidentally, "axial sectional view" means a sectional view that is taken along a plane including the center of an axis, in the axial direction.

As shown in FIG. 1, the liquid-sealed antivibration device 1 is provided with a first attaching member 2 attached to a power unit (not shown) such as an engine of a motor vehicle, a cylindrical second attaching member 3 attached to a body frame (not shown) through a bracket, and an antivibration base body 4 connecting the first attaching member 2 and the second attaching member 3 and constituted by a rubber-like elastic body.

As shown in FIG. 1, the first attaching member 2 is made of a metal material and is provided with a bolt hole 2a on the top surface. The bolt hole 2a is brought into connection with a bolt (not shown) attached to the bracket of the power unit, and hence . . . the first attaching member 2 is attached to a vibration source.

The second attaching member 3 is formed of a metal material in a cylindrical shape and is attached on the body frame side (not shown) through the bracket. The second attaching member 3 is formed with a caulked portion 3a bending radially inward at an end surface on the other-axial side (the lower side in FIG. 1). In the state of a product shown in FIG. 1 (after a diameter reduction process), the diameter of the bending extreme end surface of the caulked portion 3a is made to be smaller than the outside diameter of an outer fitting member 11 to be described later.

The antivibration base body 4 takes the form of a truncated cone and is vulcanization-bonded to the outer peripheral surface of the first attaching member 2 at an upper end portion and to an upper-side inner peripheral surface of the second attaching member 3 at a lower end portion, respectively. A hollow portion narrowed upward is formed on a lower surface side of the antivibration base body 4, and a rubber film 4a covering the inner peripheral surface of the second attaching member 3 is connected to a stepped portion 4b at a lower end portion of the antivibration base body 4.

The rubber film 4a is a portion that holds a later-mentioned formed body 1a inside thereof and is arranged with a fixed thickness on an inner peripheral surface on the other axial side (the lower side in FIG. 1) of the second attaching member 3.

The stepped portion 4b is a portion which acts as a stopper surface when the later-mentioned formed body 1a is inserted into the rubber film 4a and is formed to connect, the antivibration base body 4 to the rubber film 4a and to be thicker on the radially inner side than the rubber film 4a. Further, at a portion connected to the rubber film 4a, there is formed an end surface representing a flat surface in the radial direction (the right-left, direction in FIG. 1).

On the inner surface of the rubber film 4a covering the inner peripheral surface of the second attaching member 3, a partition member 20 is disposed on one axial side (the upper side in FIG. 1), a diaphragm 10 is disposed on the other axial side (the lower side in FIG. 1), and a liquid-sealed chamber 6 is defined between the antivibration base body 4 and the diaphragm 10.

The partition member 20 is disposed on the inner peripheral surface of the rubber film 4a to divide the liquid-sealed chamber 6 into a first chamber 6a on the antivibration base body 4 side and a second chamber 6b on the diaphragm side and is provided with an orifice making communication of the first chamber 6a with the second chamber 6b.

The partition member 20 is formed to be divided into two in the axial direction and is formed by the combination in the axial direction of a first member 21 disposed on one axial side (the upper side in FIG. 1) with a second member 22 disposed on the other axial side (the lower side in FIG. 1). Further, the partition member 20 interposes a round-shaped membrane member 23 between the first member 21 and the second member 22.

The diaphragm 10 is formed by a thin, elastic rubber film with slack in the axial direction and takes a round shape as viewed in the axial direction. At a center part in the axial direction of the diaphragm 10, an opening 10a is formed passing through in the axial direction, and an air port 30 is inserted into the opening 10a.

Figure 2A:
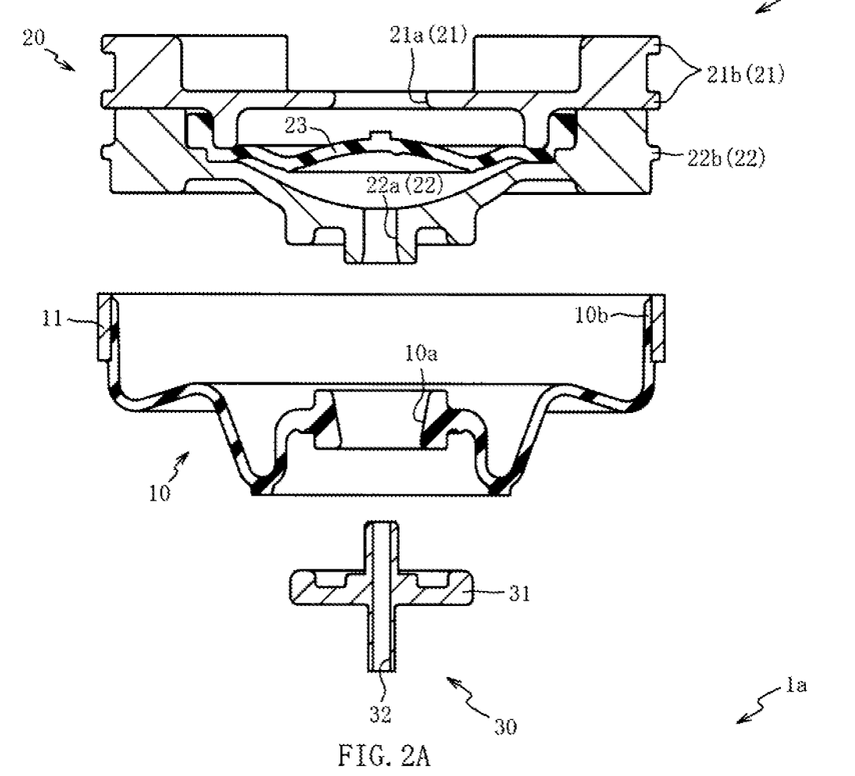
FIG. 2(a) is an exploded axial sectional view a formed body.
Figure 2B:
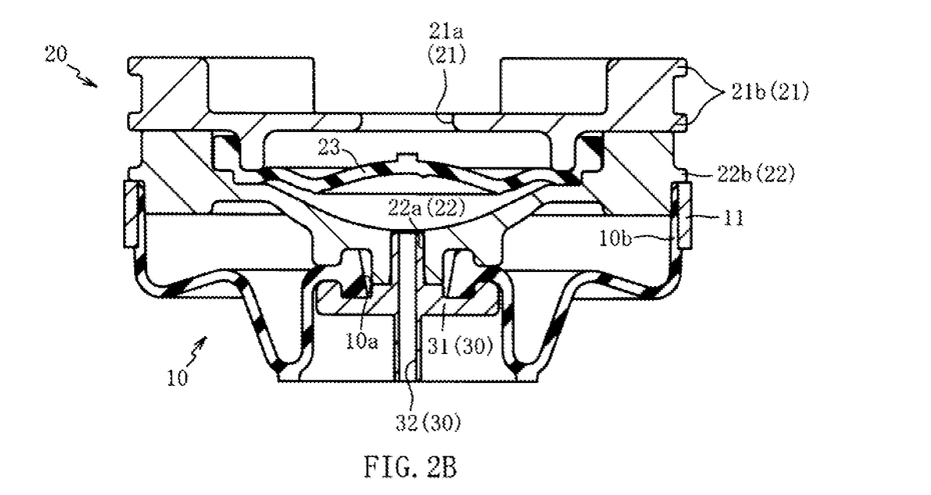
FIG. 2(b) is an axial sectional view of the formed body.

Here, the formed body 1a will be described with reference to FIG. 2. FIG. 2(a) is an exploded axial sectional view of the formed body 1a, and FIG. 2(b) is an axial sectional view of the formed body 1a. The formed body 1a is formed to be composed mainly of the partition member 20, the diaphragm 10 and the air port 30.

As shown in FIG. 2(a) and FIG. 2(b), the first member 21 of the partition member 20 is formed to have an almost rectangular section continued in the circumferential direction and take a round shape as viewed in the axial direction and is formed almost at a center part thereof with a through hole 21a passing through in the axial direction. Further, on an outer peripheral surface on the radially outer side, protruding walls 21b are formed to protrude radially outward from axially opposite ends and to continue in the circumferential direction.

The second member 22 is formed to have an almost rectangular section continued in the circumferential direction to take a round shape as viewed in the axial direction and is formed at a center part thereof with a through hole 22a passing through in the axial direction. Further, on an outer peripheral surface on the radially outer side, a protruding portion 22b is formed to protrude radially outward almost from an axial center and continue in the circumferential direction.

Incidentally, the outside diameters of the first member 21 and the second member 22 that will be described in the following embodiments are outside diameters excluding those of the protruding walls 21b and the protruding portion 22b.

As mentioned earlier, the membrane member 23 takes a round shape as viewed in the axial direction, is disposed at the axial center of the first member 21 and the second member 22 and has its outer edge part held between the first member 21 and the second member 22.

The diaphragm 10 is provided at its outer edge part with an interposition portion 10b which is arranged on an inner peripheral surface of the outer fitting member 11 to be a predetermined dimension in thickness. The interposition portion 10b has the inside diameter formed to be smaller than the outside diameter of the second member 22 which diameter is on the other axial side (the lower side in FIG. 2(a) and FIG. 2(b)) with respect to the protruding portion 22b, and is vulcanization-bonded to the inner peripheral surface of the outer fitting member 11. That is, the interposition portion 10b is formed to have a predetermined press-fitting margin.

The outer fitting member 11 is a cylindrical member made of a metal material and is formed to have a predetermined width in the axial direction and an inside diameter being larger than the outside diameter of the second member 22. Further, the outside diameter of the outer fitting member 11 is formed to be almost the same as the outside diameter at the extreme end surface of the protruding walls 21b. The outer fitting member 11 is externally fitted (press-fitted) on the other axial side (the lower side in FIG. 2(a) and FIG. 2(b)) of the second member 22 (the partition member 20) through the interposition portion 10b and is held in contact with the protruding portion 22b of the second member 22 at an end surface on one axial side (the upper side in FIG. 2(a) and FIG. 2(b)).

The air port 30 is formed to be provided with a portion taking a cylindrical outer shape and an enlarged portion 31 radially enlarged to be disc-like almost at axial center position. Further, the air port 30 is formed with a vent hole 32 passing therethrough on the axis. The outside diameter of the cylindrical portion on one axial side (the upper side in FIG. 2(a) and FIG. 2(b)) of the air port 30 is formed to foe a little smaller than the inside diameter of a through hole 22a of the second member 22.

Then, description will be made regarding a method of assembling the partition member 20, the diaphragm 10 and the air port 30. First, description will be made regarding a method of assembling the diaphragm 10 and the partition member 20. As mentioned before, the inside diameter of the interposition portion 10b is formed to be a litter smaller than the outside diameter of the second member 22 on the other axial side (the lower side in FIG. 2(a) and FIG. 2(b)) with respect to the protruding portion 22b, and thus, the outer fitting member 11 is externally fitted (press-fitted) on the second member 22 (the partition member 20) with the interposition portion 10b interposed therebetween. Therefore, the diaphragm 10 vulcanization-bonded to the outer fitting member 11 can be assembled to the partition member 20.

Further, in this case, since the end surface on one axial side (the upper side in FIG. 2(a) and FIG. 2(b)) of the outer fitting member 11 is brought into contact with the end surface on the other axial side (the lower side in FIG. 2(a) and FIG. 2(b)) of the protruding portion 22b of the second member 22, the outer fitting member 11 can be axially positioned relative to the partition member 20. Therefore, the outer fitting member 11 can be restrained from inclining relative to the partition member 20.

Next, description will be made regarding a method of assembling the air port 30 and the partition member 20. As mentioned before, since the outside diameter at the cylindrical portion of the air port 30 is formed to be a little smaller than the inside diameter of the through hole 22a, the air port 30 and the partition member 20 can be assembled by internally fitting (press-fitting) one axial side (the upper side in FIG. 2(a) and FIG. 2(b)) of the air port 30 into the through hole 22a.

In this case, the enlarged portion 31 of the air port 30 holds an inner edge part of the diaphragm 10 between itself and the second member 22. That is, fixing the inner edge part of the diaphragm 10 can be attained together with assembling the air port 30. Thus, a formed body 1a shown in FIG. 2(b) can be formed.

Figure 3A:
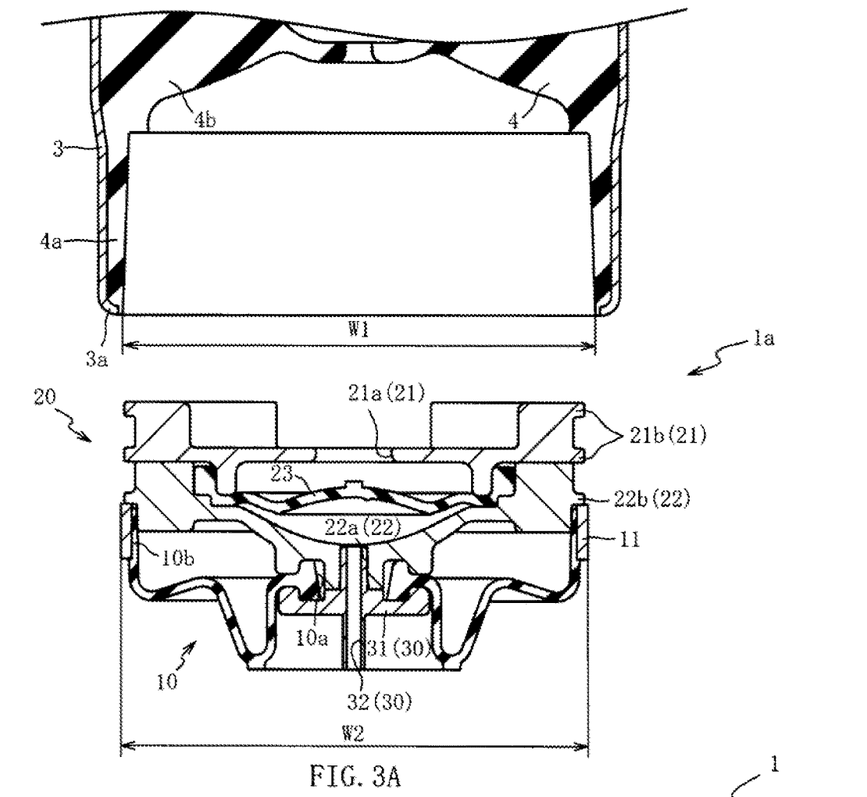
FIG. 3(a) is a partially enlarged, exploded, axial-sectional view of the liquid-sealed antivibration device before a diameter reduction process.

Next, with reference to FIG. 3, description will be made regarding a method of assembling the formed body 1a to the second attaching member 3. FIG. 3(a) is a partially enlarged, exploded axial-sectional view the liquid-sealed antivibration device 1 before a diameter reduction process, and FIG. 3(b) is a partially enlarged, axial-sectional view of the liquid-sealed antivibration device 1 before the diameter reduction process.

As shown in FIG. 3(a), the inside diameter dimension W1 of the rubber film 4a before the diameter reduction process is set to almost the same dimension as the outside diameter dimension W2 of the formed body 1a. Thus, it is possible to insert, the formed body 1a inside the inner peripheral surface of the rubber film 4a (W1=W2).

Figure 3B:
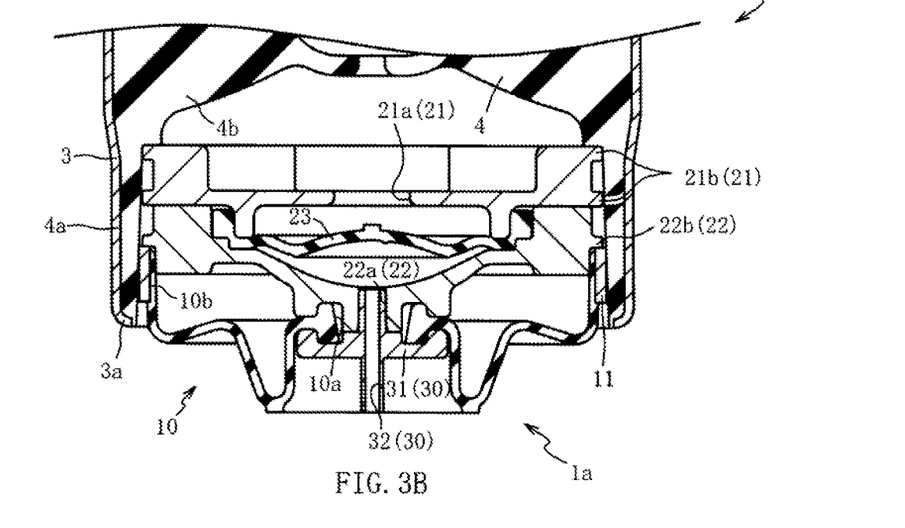
FIG. 3(b) is a partially enlarged, axial-sectional view of the liquid-sealed antivibration device before the diameter-reduction process.

As shown in FIG. 3(b), when the formed body 1a is inserted into the rubber film 4a, the end surface on one axial side (the upper side in FIG. 3(a) and FIG. 3(b)) of the formed body 1a can be brought into contact with the end surface on the other axial side (the lower side in FIG. 3(a) and FIG. 3(b)) of the stepped portion 4b. Thus, the formed body 1a can be positioned in the axial direction.

Finally, with the formed body 1a inserted inside the inner peripheral surface of the rubber film 4a, a lower part, (the lower side in FIG. 3(a) and FIG. 3(b)) of the second, attaching member 3 is subjected to the diameter reduction process to make the inside diameter of the rubber film 4a small. That is, the inside diameter of the rubber film 4a is made to be smaller than the outside diameter dimension W2 of the formed body 1a (the outside diameter of the outer fitting member 11). Thus, the rubber film 4a can closely adhere to the outer peripheral surfaces of the outer fitting member 11, the protruding walls 21b of the first member 21 and the protruding portion 22b of the second member 22, so that the formed body 1a can be held to be elastically supported by the elastic force of the rubber film 4a. As a result, the liquid-sealed antivibration device 1 (refer to FIG. 1) can be manufactured.

Further, when the lower end side (the lower side in FIGS. 3(a) and 3(b)) of the second attaching member 3 is subjected to the diameter reduction process, the diameter of the bent extreme end surface of a caulked portion 3a can be made smaller than the outside diameter of the outer fitting member 11, so that the formed body 1a can be restrained from slipping out of the interior of the second attaching member 3.

In the present embodiment, the interposition portion 10b is formed to the fixed thickness, and the outer fitting member 11 is externally fitted (press-fitted) on the second member 22 with the interposition portion 10b interposed therebetween. Thus, when the second attaching member 3 is subjected to the diameter reduction process, the outer fitting member 11 can be restrained from being displaced in a direction to slip out of the partition member 20. Therefore, the outer fitting member 11 is restrained from falling eccentric or inclined relative to the partition member 20. This enables the outer fitting member 11 and the diaphragm 10 to be improved in position accuracy.

Further, since the end surface on one axial side (the upper side in FIG. 3(a) and FIG. 3(b)) of the outer fitting member 11 is held in contact with the end surface on the other axial side (the lower side in FIG. 3(a) and FIG. 3(b)) of the protruding portion 22b of the second member 22, the outer fitting member 11 can be restrained from inclining relative to the partition member 20 when the diameter reduction process is given to the second attaching member 3. As a result, it can be realized that the outer fitting member 11 and the diaphragm 10 are improved in position accuracy.

Further, the rubber film 4a is formed up to an end surface on the other axial side (the lower side in FIG. 3(a) and FIG. 3(b)) of the second attaching member 3, and when the second attaching member 3 is subjected to the diameter reduction process, the rubber film 4a is adhered closely to the outer peripheral surface of the protruding portion 22b of the second member 22 (the partition member 20) and the outer peripheral surface of the outer fitting member 11. Therefore, a liquid-tight sealing can be attained between the partition member 20 and the outer-fitting member 11 (the externally fitting surface).

Further, since the interposition portion 10b lies within a surface where the partition member 20 and the outer fitting member 11 are brought into the external fitting (press-fitting), subjecting the second attaching member 3 to the diameter reduction process and, at the same time, pressing the surface on the radially outer side of the outer fitting member 11 inwardly cause the interposition portion 10b to be pressed against the side surface of the partition member 20. This makes it possible to attain a liquid-tight sealing between the partition member 20 and the outer fitting member 11 (the external fitting surface).

Next, a second embodiment will be described with reference to FIG. 4(a). In the first embodiment, description has been made of the case in which the outer peripheral surface of the second member 22 of the partition member 20 is continuously formed to represent a round shape as viewed in the axial direction. However, in the second embodiment, concavities 222a that are hollow radially inward are defined on the outer peripheral surface of a second member 222 of a partition member 220.

Figure 4A:
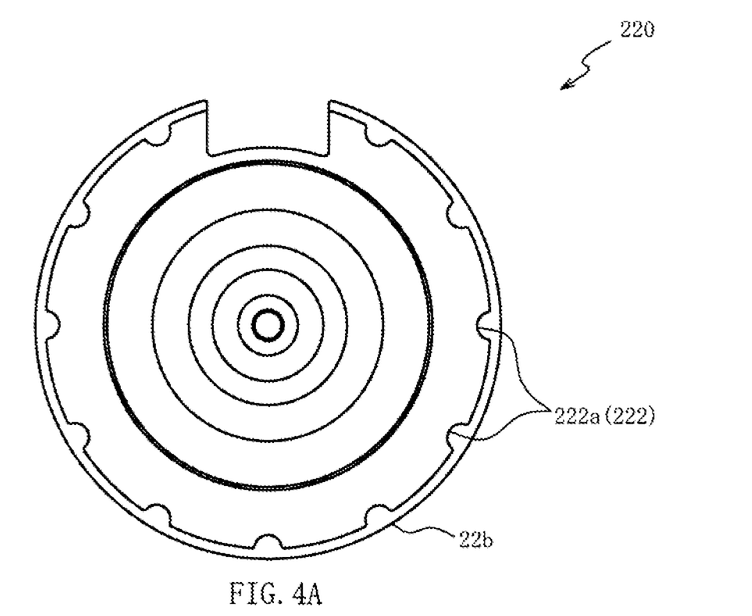
FIG. 4(a) is a bottom view of a partition member in a second embodiment.

FIG. 4(a) is a bottom view of the partition member 220 in the second embodiment. Incidentally, the same portions as those in the first embodiment will be given the same reference numerals and will be omitted in the following description.

As shown in FIG. 4(a), the second member 222 of the partition member 220 in the second embodiment is formed so that the outside diameter on the other axial side (the front side of the sheet surface in FIG. 4(a)) with respect to the protruding portion 22b is a round shape whose diameter is a little larger than the inside diameter of the interposition portion 10b and that a plurality of concavities 222a being hollow radially inward are distributed in the circumferential direction.

The concavities 222a are each formed to be curved in a semicircular shape as viewed in the axial direction and are each provided to be hollow from the end surface on the other axial side (the front side of the sheet surface in FIG. 4(a)) of the second member 222 up to the end surface on the other axial side of the protruding portion 22b. Thus, in externally fitting (press-fitting) the outer fitting member 11 on the partition member 220 (the second member 222) through the interposition portion 10b, the contact area of the interposition portion 10b with the partition member 220 can be made to be small, and hence, the force spent for the press-fitting can be made to be small by that amount. As a result, the outer fitting member 11 can be externally fitted (press-fitted) on the partition member 220 smoothly. Incidentally, in the second embodiment, the concavities 222a are formed at eleven places in the circumferential direction.

Further, since the concavities 222a are arranged to be distributed in the circumferential direction, it becomes easy to allow the displacement in the radial direction of the outer fitting member 11 relative to the partition member 220 by taking advantage of the elastic deformation of the interposition portion 10b. That is, in performing the diameter reduction process of the second attaching member 3, the eccentricity of the outer fitting member 11 relative to the partition member 20 can be offset, and hence, it can be realized that the outer fitting member 11 and the diaphragm 10 are improved in position accuracy.

Next, a third embodiment will be described with reference to FIG. 4(b). In the first embodiment, description has been made of the case wherein the interposition portion 10b is formed to be fixed in thickness. In the third embodiment, however, an interposition portion 310b is formed with concavities 310c at the inner peripheral surface thereof.

Figure 4B:
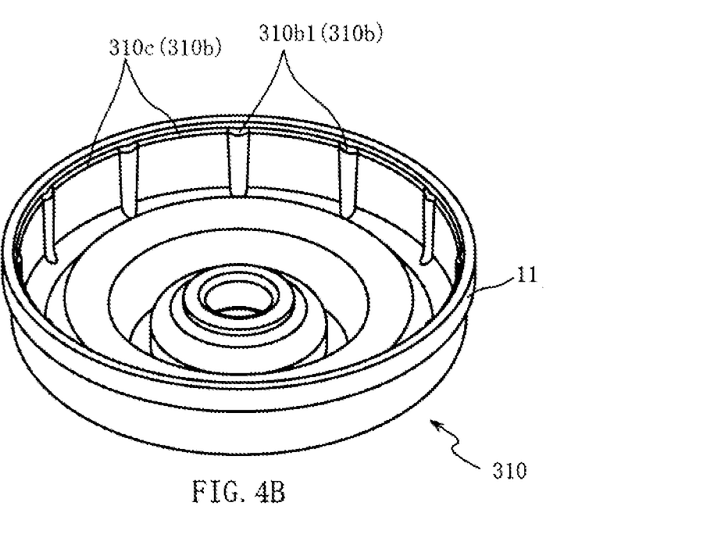
FIG. 4(b) is a perspective top view of a diaphragm in a third embodiment.

FIG. 4(b) is a perspective top view of a diaphragm 310 in the third embodiment. Incidentally, the same portions as those in the first embodiment will be given the same reference numerals and will be omitted in the following description.

As shown in FIG. 4(b), the concavities 310c are parts that are provided to be hollow radially outward at the inner peripheral surface of the interposition portion 310b and are formed plurally to be distributed in the circumferential direction at those areas where the later-mentioned projectingly disposed parts 310b1 do not protrude, on the inner peripheral surface of the interposition portion 310b.

In contrast, at those areas of the inner peripheral surface of the interposition portion 310b which areas are not provided to be hollow as the concavities 310c, the projectingly disposed parts 310b1 which are each curved in a semicircular shape as viewed from above to become convex radially inward are arranged to be distributed in the circumferential direction. An imaginary circle that is drawn to pass through the protruding tops of the projectingly disposed parts 310b1 is formed to be a little smaller in diameter than the outside diameter of the second member 22 which diameter is on the other axial side with respect to the protruding portion 22b.

Thus, it is possible to make small the contact area or contact pressure between the outer peripheral surface of a partition member 320 and the inner peripheral surface of the interposition portion. As a result, the outer fitting member 11 can be externally fitted (press-fitted) on the partition member 320 smoothly.

Further, since the concavities 310c are arranged to be distributed in the circumferential direction, it becomes easy to allow the displacement in the radial direction of the outer fitting member 11 relative to the partition member 320 by taking advantage of the elastic deformation of the interposition portion 310b. That is, in performing the diameter reduction process of the second attaching member 3, the eccentricity of the outer fitting member 11 relative to the partition member 320 can be offset, and hence, it can foe realized that the outer fitting member 11 and the diaphragm 10 are improved in position accuracy.

Incidentally, in this case, the concavities 310c are provided to be hollow at the inner peripheral surface of the interposition portion 310b. Thus, since such concavities 310c can be formed by mold-forming by the use of a vulcanization mold, a reduction in manufacturing cost can be realised.

That is, the concavities 222a in the second embodiment require a separate step (a cutting step) because of becoming complication in shape and, thus, being difficult to be formed by mold-forming only. To the contrary, the concavities 310c in the third embodiment can be formed in the direction in which a forming mold is drawn out. This makes it possible to form the concavities 310c through a step for mold-forming only, so that a reduction in manufacturing cost can be realized.

Next, a fourth embodiment will be described with reference to FIG. 5(a). In the first embodiment, description has been made of the case wherein the protruding portion 22b is formed to protrude radially at almost an axial center position of the partition member 20. In the fourth embodiment, however, a protrusion 422c is formed independently of the protruding portion 22b.

Figure 5A:
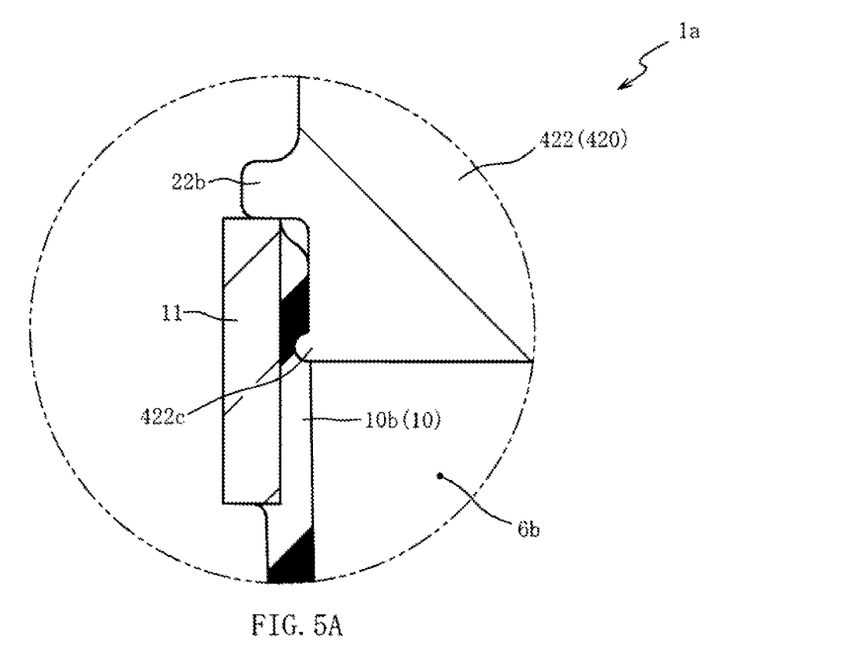
FIG. 5(a) is a partially enlarged, axial-sectional view of a formed body in a fourth embodiment.

FIG. 5(a) is a partially enlarged, axial-sectional view of the formed body 1a in the fourth embodiment. Incidentally, the same portions as those in the first embodiment will be given the same reference numerals and will be omitted in the following description.

As shown in FIG. 5(a), a second member 422 of a partition member 420 in the fourth embodiment is formed so that the protrusion 422c which protrudes radially outward from an end surface on the other axial side (the lower side in FIG. 5(a)) is continued in the circumferential direction.

The protrusion 422c is formed to have a protruding dimension being smaller than the thickness dimension in the radial direction of the interposition portion 10b and a protruding extreme end whose section shape is curved in a semicircular shape.

Thus, when the outer fitting member 11 is externally fitted, (press-fitted) on the partition member 420 with the interposition portion 10b interposed therebetween, the protrusion 422c cuts into the interposition portion 10b, so that the contact pressure between the interposition portion 10b and the protrusion 422c can be increased. Therefore, the outer fitting member 11 can be restrained from slipping out of the partition member 420. As a result, when the second attaching member 3 is subjected to the diameter reduction process, the outer fitting member 11 is restrained from inclining relative to the partition member 420, and hence, it can be realized that the outer fitting member 11 and the diaphragm 10 are improved in position accuracy.

Further, since restraint means for restraining the outer fitting member 11 from slipping out of the partition member 420 is formed on the outer peripheral surface of the partition member 420, the forming of the restraint means can be done easily. Specifically, where the restraint means is formed at the interposition portion 10b connected to the outer edge part of the diaphragm 10, the restraint means is formed in a direction orthogonal to a direction in which a vulcanization mold is drawn out at the time of a vulcanization forming of the diaphragm 10, and this requires drawing the vulcanization mold by force out of the inner peripheral surface of the diaphragm 10. In contrast, where the restraint means is formed on the outer peripheral surface of the partition member 420, it is possible to form the restraint means in a direction in which a mold for mold-forming the partition member 420 is drawn out, and this makes it easy to draw out the mold. As a result, the forming of the restraint means can be done easily.

Next, a fifth embodiment will be described with reference to FIG. 5(b). In the first embodiment, description has been made of the case wherein the interposition portion 10b is formed to be fixed in thickness. In the fifth embodiment, however, the interposition portion 10b is provided with a protrusion 510c protruding radially inward.

Figure 5B:
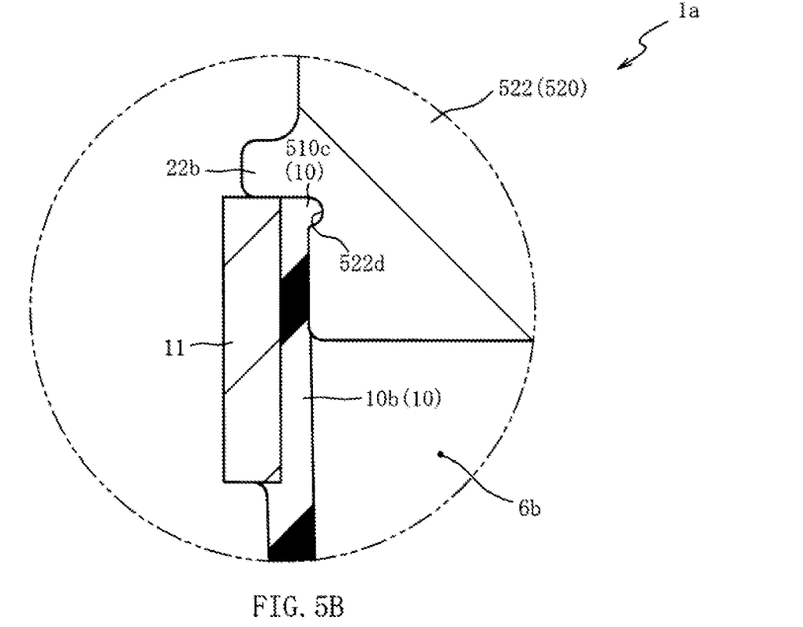
FIG. 5(b) is a partially enlarged, axial-sectional view of a formed body in a fifth embodiment.

FIG. 5(b) is a partially enlarged, axial-sectional view of the formed body 1a in the fifth embodiment. Incidentally, the same portions as those in the first embodiment will be given the same reference numerals and will be omitted in the following description.

As shown in FIG. 5(b), the interposition portion 10b in the fifth embodiment is formed with the protrusion 510c that protrudes radially inward from an end portion on one axial side (the upper side in FIG. 5(b)).

The protrusion 510c is formed to have a protruding extreme end whose axial section is curved in a semicircular shape, and to be continued in the circumferential direction. Further, a partition member 520 (a second member 522) is provided at an outer peripheral surface facing the protrusion 510c with a concavity 522d which is hollow to represent almost the same shape as the protrusion 510c.

Thus, when the outer fitting member 11 is externally fitted (press-fitted) on the partition member 520 with the interposition portion 10b interposed therebetween, the protrusion 510c is fitted in the concavity 522d of the partition member 520 (the second member 522), so that the outer fitting member 11 can be restrained from slipping out of the partition member 520.

As a result, when the second attaching member 3 is subjected to the diameter reduction process, the outer fitting member 11 is restrained from inclining relative to the partition member 520, and hence, it can be realized that the outer fitting member 11 and the diaphragm 10 are improved in position accuracy.

Further, in the fifth embodiment, since the protrusion 510c of the interposition part 10b and the concavity 522d of the partition member are formed to take the same shape, the elastic deformation of the protrusion 510c can be avoided to occur when the protrusion 510c and the concavity 522d are engaged (fitted). Accordingly, when the outer fitting member 11 is externally fitted on the partition member 520, it can be restrained that by the elastic return force of the interposition portion 10b, a force acts on the outer fitting member 11 to displace the same relative to the partition member 520. Thus, since the outer fitting member 11 can be restrained from being displaced relative to the partition member 520 in a direction to separate from the protruding portion 22b, the outer fitting member 11 can be restrained from being displaced in a direction to slip out of the partition member 520. As a result, when the second attaching member 3 is subjected to the diameter reduction process, the outer fitting member 11 can be restrained from inclining relative to the partition member 520, so that the outer fitting member 11 and the diaphragm 10 can be improved in position accuracy.

Next, a sixth embodiment will be described with reference to FIG. 6(a). In the first embodiment, description has been made of the case wherein the outside diameter of the partition member 20 (the second member 22) on the other axis side (the lower side in FIG. 6(a)) with respect to the protruding portion 22b is formed to be fixed. In the sixth embodiment, however, the outside diameter of a partition member 620 (a second member 622) on the other axis side (the lower side in FIG. 6(a)) with respect to the protruding portion 22b is formed to increase toward the other axial side.

Figure 6A:
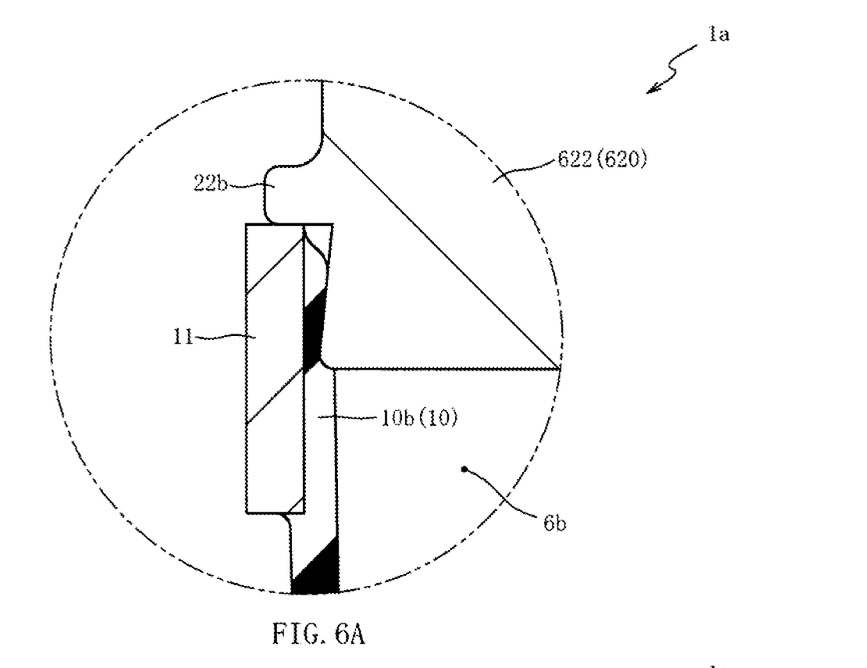
FIG. 6(a) is a partially enlarged, axial-sectional view of a formed body in a sixth embodiment.

FIG. 6(a) is a partially enlarged, axial-sectional view of the formed body 1a in the sixth embodiment. Incidentally, the same portions as those in the first-embodiment will be given the same reference numerals and will be omitted in the following description.

As shown in FIG. 6(a), the partition member 620 (the second member 622) in the sixth embodiment is formed to take a truncated cone shape wherein the outside diameter on the other axial side (the lower side in FIG. 6(a)) with respect to the protruding portion 22b increases toward the other axial side. Further, the outside diameter on the other axial side is formed to be smaller than the outside diameter of the interposition portion 10b (the vulcanization-bonding surface of the outer fitting member 11).

Thus, when the outer fitting member 11 is externally fitted (press-fitted) on the partition member 620 (the second member 622) with the interposition portion 10b interposed therebetween, the partition member 620 can make the surface on the other axial side (the lower side in FIG. 6(a)) with respect to the protruding portion 22b cut into the interposition portion 10b, so that the outer fitting member 11 can be restrained from slipping out of the partition member 620. As a result, when the second attaching member 3 is subjected to the diameter reduction process, the outer fitting member 11 is restrained from inclining relative to the partition member 620, and hence, it can be realized that the outer fitting member 11 and the diaphragm 10 are improved in position accuracy.

Further, since restraint means for restraining the outer fitting member 11 from slipping out of the partition member 620 is formed on the outer peripheral surface of the partition member 620, the forming of the restraint means can be done easily. Specifically, where the restraint means is formed at the interposition portion 10b connected to the outer edge part of the diaphragm 10, the restraint means is formed at the time of a vulcanization forming of the diaphragm 10 in a direction orthogonal to a direction in which a vulcanization mold is drawn out, and this requires drawing the vulcanization mold by force out of the inner peripheral surface of the diaphragm 10. In contrast, where the restraint means is formed on the outer peripheral surface of the partition member 620, it is possible to form the restraint means in a direction in which a mold for mold-forming the partition member 620 is drawn out, and this makes it easy to draw out the mold. As a result, the forming of the restraint means can be done easily.

Furthermore, since the outer peripheral surface of the partition member 620 gradually decreases in outside diameter as going from an end part in the axial direction toward the protruding portion 22b side, the outer fitting member 11 can foe restrained from being displaced relative to the partition member 620 in a direction to separate from the protruding portion 22b.

That is, because the outer peripheral surface of the partition member 620 is made as a surface sloping relative to the axial direction, the direction in which the outer fitting member 11 is displaced by the action of the elastic return force of the interposition portion 10b can be made as a direction in which the outer fitting member 11 comes close to the protruding portion 22b relative to the partition member 620. Thus, since the outer fitting member 11 can be restrained from being displaced relative to the partition member 620 in a direction to separate from the protruding portion 22b, the outer fitting member 11 can be restrained from being displaced in a direction to slip out of the partition member 620. Accordingly, when the second attaching member 3 is subjected to the diameter reduction process, the outer fitting member 11 can be restrained from inclining relative to the partition member 620, so that the outer fitting member 11 and the diaphragm 10 can be improved in position accuracy.

Next, a seventh embodiment will be described with reference to FIG. 6(b). In the first embodiment, description has been made of the case wherein the outside diameter of the outer fitting member 11 is formed to be larger than the outside diameter at the protruding extreme end surface of the protruding portion 22b of the partition member 20 (the second member 22). In the seventh embodiment, however, the outside diameter of the outer fitting member 11 is formed to be smaller than the outside diameter at the protruding extreme end surface of the protruding portion 22b of a partition member 720 (a second member 722).

Figure 6B:
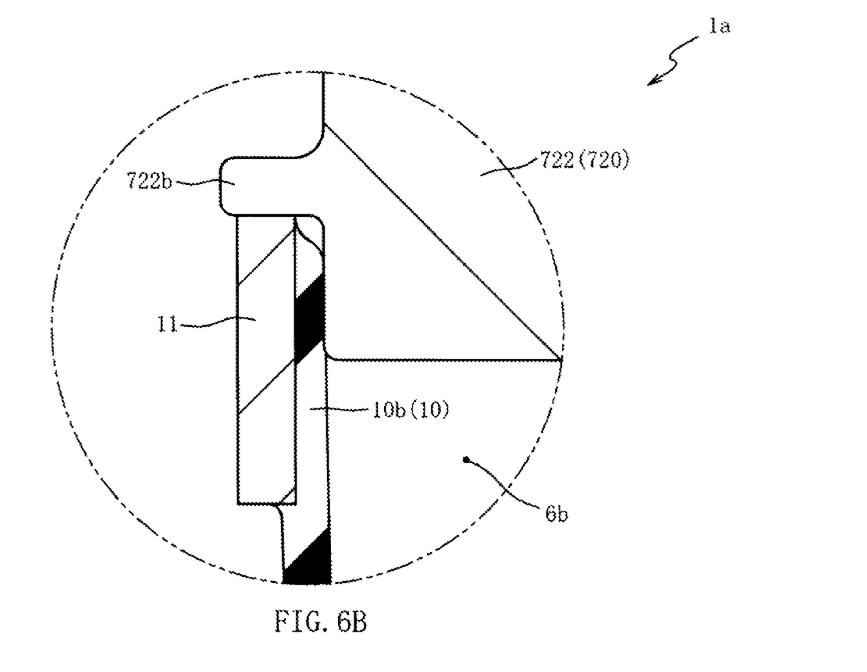
FIG. 6(b) is a partially enlarged, axial-sectional view of a formed body in a seventh embodiment.

FIG. 6(b) is a partially enlarged, axial-sectional view of the formed body 1a in the seventh embodiment. Incidentally, the same portions as those in the first embodiment will be given the same reference numerals and will be omitted in the following description.

As shown in FIG. 6(b), the second member 722 of the partition member 720 in the seventh embodiment is formed so that a protruding portion 722b is larger on the radially outward side than the protruding potion 22b in the first-embodiment and that the outside diameter at the protruding extreme end is larger than the outside diameter of the outer fitting member 11. That is, the thickness dimension of the outer fitting member 11 is set to a smaller dimension than the protruding dimension of the protruding portion 722b. Therefore, the outer peripheral surface of the outer fitting member 11 is located radially inside the protruding extreme end of the protruding portion 722b.

Thus, in inserting the formed body 1a (the partition member 720 with the outer fitting member 11 externally fitted (press-fitted) thereon) inside the second attaching member 3, a resistance in the opposition direction to the inserting direction acts from the rubber film 4a onto the outer fitting member 11, and this can restrain the outer fitting member 11 from slipping out of the partition member 720.

Specifically, where the outer fitting member 11 is located outside the extreme end of the protruding portion 722b, a corner edge on the outer peripheral surface side of the outer fitting member 11 tends to come into contact with the inner peripheral surface of the rubber film 4a vulcanization-bonded to the inner surface of the second attaching member 3 before the protruding portion 22b. In the seventh embodiment, however, since the outer peripheral surface of the outer fitting member 11 is located radially inside the extreme end of the protruding portion 722b, it can be made hard for the outer peripheral surface of the outer fitting member 11 to come into contact with the inner peripheral surface of the rubber film 4a. Therefore, it is possible to improve the position accuracy of the outer fitting member 11 relative to the partition member 720.

Although having been described based on the embodiments as described hereinabove, the present invention is not in any way limited to the aforementioned embodiments, and it is easily inferable that various improvements and modifications are possible without departing from the gist of the present invention.

Although, in each of the foregoing embodiments, a case in which the partition member 20, 220, 420, 520, 620, 720 and the outer fitting member 11 are made of metal materials has been described, these members are not necessarily limited to that case. For example, both or either one of the partition member 20, 220, 420, 520, 620, 720 and the outer fitting member 11 may be made of a flexible0085 material.

Although a case in which the protruding portion 22b is formed continuously in the circumferential direction has been described each of the foregoing embodiments, the protruding portion 22b is not necessarily limited to that case.

For example, the protruding portion 22b may be as those protruding radially outward from a plurality of places at predetermined intervals in the circumferential direction.

In this case, it is preferable to provide the protruding portions at least at three places. Since the protruding portions serve to position the outer fitting member 11 in the axial direction, the positioning at two places or one place makes it difficult to perform the positioning accurately. To the contrary, forming the protruding portions at least at three places makes it possible to improve the accuracy in positioning the outer fitting member 11 in the axial direction.

Although a case in which the outer peripheral surface of the outer fitting member 11 is located radially inside the extreme end of the protruding portion 22b, 722b has been described in the foregoing seventh embodiment, the outer peripheral surface of the outer fitting member 11 is not necessarily limited to that case and may be the same in outside diameter as the extreme end of the protruding portion 22b, 722b.

In this case, in addition to the advantageous effects attained in the seventh embodiment, it can also be attained that because the extreme end surface in the radial direction of the protruding portion 22b, 722b agrees in outside diameter with the outer peripheral surface of the outer fitting member 11, the adhesion is improved with which the rubber film 4a is closely adhered to the protruding portion 22b, 722b and the outer fitting member 11 when the second attaching member 3 is subjected to the diameter reduction process. As a result, the sealing property can be improved which brings about fluid-tightness between the partition member 20 and the outer fitting member 11 (the external fitting surface).

The invention claimed is:

1. A liquid-sealed antivibration device comprising a first attaching member, a cylindrical second attaching member, an antivibration base body connecting the first attaching member and the second attaching member and constituted by a rubber elastic body, a diaphragm defining a liquid-sealed chamber between itself and the antivibration base body and constituted by a rubber elastic body, a partition member dividing the liquid-sealed chamber into a first chamber on the antivibration base body side and a second chamber on the diaphragm side, and an orifice making communication between the first chamber and the second chamber, wherein:
   there are provided a cylindrical outer fitting member externally fitted on the partition member and an interposition portion arranged on an inner peripheral surface of the outer fitting member to be a fixed dimension in thickness, connected to an outer edge part of the diaphragm and made of a rubber elastic body;
   the outer fitting member is externally fitted on the partition member with the interposition portion interposed between the outer fitting member and the partition member;
   the partition member is provided with a protruding portion which protrudes radially outward from an outer peripheral surface and with which an axial end surface of the externally fitted outer fitting member is brought into contact, and is formed to be cylindrical at an area where the outer fitting member is externally fitted; and
   the second attaching member is subjected to a diameter reduction process with the outer fitting member externally fitted on the partition member, and
   wherein concavities are provided to be hollow on one of the outer peripheral surface of the partition member and the inner peripheral surface of the interposition portion and wherein the concavities are arranged to be distributed in the circumferential direction.

2. The liquid-sealed antivibration device according to claim 1, wherein the concavities are provided to be hollow on the inner peripheral surface of the interposition portion.

3. A liquid-sealed antivibration device comprising a first attaching member, a cylindrical second attaching member, an antivibration base body connecting the first attaching member and the second attaching member and constituted by a rubber elastic body, a diaphragm defining a liquid-sealed chamber between itself and the antivibration base body and constituted by a rubber elastic body, a partition member dividing the liquid-sealed chamber into a first chamber on the antivibration base body side and a second chamber on the diaphragm side, and an orifice making communication between the first chamber and the second chamber, wherein:
   there are provided a cylindrical outer fitting member externally fitted on the partition member and an interposition portion arranged on an inner peripheral surface of the outer fitting member to be a fixed dimension in thickness, connected to an outer edge part of the diaphragm and made of a rubber elastic body;
   the outer fitting member is externally fitted on the partition member with the interposition portion interposed between the outer fitting member and the partition member;
   the partition member is provided with a protruding portion which protrudes radially outward from an outer peripheral surface and with which an axial end surface of the externally fitted outer fitting member is brought into contact, and is formed to be cylindrical at an area where the outer fitting member is externally fitted;
   the second attaching member is subjected to a diameter reduction process with the outer fitting member externally fitted on the partition member, and
wherein:
   there is provided a film portion connected to the antivibration base body, arranged on an inner peripheral surface of the second attaching member and made of a rubber elastic body; and
   the outside diameter dimension of the outer fitting member is set to the same dimension as, or a smaller dimension than, the outside diameter dimension at the protruding portion of the partition member.

4. The liquid-sealed antivibration device according to claim 3, wherein the outside diameter dimension of the outer fitting member is set to the same dimension as the outside diameter dimension at the protruding portion of the partition member.

5. A liquid-sealed antivibration device comprising a first attaching member, a cylindrical second attaching member, an antivibration base body connecting the first attaching member and the second attaching member and constituted by a rubber elastic body, a diaphragm defining a liquid-sealed chamber between itself and the antivibration base body and constituted by a rubber elastic body, a partition member dividing the liquid-sealed chamber into a first chamber on the antivibration base body side and a second chamber on the diaphragm side, and an orifice making communication between the first chamber and the second chamber, wherein:
   there are provided a cylindrical outer fitting member externally fitted on the partition member and an interposition portion arranged on an inner peripheral surface of the outer fitting member to be a fixed dimension in thickness, connected to an outer edge part of the diaphragm and made of a rubber elastic body;

the outer fitting member is externally fitted on the partition member with the interposition portion interposed between the outer fitting member and the partition member;

the partition member is provided with a protruding portion which protrudes radially outward from an outer peripheral surface and with which an axial end surface of the externally fitted outer fitting member is brought into contact, and is formed to be cylindrical at an area where the outer fitting member is externally fitted;

the second attaching member is subjected to a diameter reduction process with the outer fitting member externally fitted on the partition member, and wherein a restraint is formed at least on one of the outer peripheral surface of the partition member and the inner peripheral surface of the interposition portion thereby restraining the outer fitting member from being displaced relative to the partition member in a direction to separate from the protruding portion.

6. The liquid-sealed antivibration device according to claim 5, wherein the restraint is formed on the outer peripheral surface of the partition member.

7. The liquid-sealed antivibration device according to claim 6, wherein the restraint is formed as a projectingly disposed part which is provided to project radially outward from an axial end portion of the partition member.

8. The liquid-sealed antivibration device according to claim 7, wherein the projectingly disposed part of the restraint is:

a slope surface which gradually decreases in outside diameter as going from an end part on the other axial side toward the protruding portion of the partition member.

9. The liquid-sealed antivibration device according to claim 5, wherein:

the restraint is composed of a protrusion formed to protrude radially inward from the interposition portion and a concavity formed to be hollow on the outer peripheral surface of the partition member in the same shape as the external shape of the protrusion;

the protrusion and the concavity are formed at positions facing each other; and the protrusion is engaged with the concavity when the outer fitting member is externally fitted on the partition member.

* * * * *